United States Patent
Willem et al.

(10) Patent No.: US 7,380,392 B2
(45) Date of Patent: Jun. 3, 2008

(54) GUARD FOR A HEADER OF A HARVESTER

(75) Inventors: Pieter J. P. Willem, Gistel (BE); Eric A. H. Maertens, Sint-Andries (BE); Geert P. Mortier, Ghent (BE); Rudy P. A. Vandewalle, Zedelgem (BE)

(73) Assignee: CNH America LLC, New Holland, PA (US)

( * ) Notice: Subject to any disclaimer, the term of this patent is extended or adjusted under 35 U.S.C. 154(b) by 92 days.

(21) Appl. No.: 11/383,669

(22) Filed: May 16, 2006

(65) Prior Publication Data

US 2006/0266014 A1 Nov. 30, 2006

Related U.S. Application Data

(60) Provisional application No. 60/684,930, filed on May 25, 2005.

(51) Int. Cl.
*A01D 63/00* (2006.01)
*A01D 65/00* (2006.01)
(52) U.S. Cl. .................................................. 56/314
(58) Field of Classification Search .................. 56/314, 56/119, 123; 172/502
See application file for complete search history.

(56) References Cited

U.S. PATENT DOCUMENTS

| | | | | |
|---|---|---|---|---|
| 2,599,438 A | * | 6/1952 | Downing et al. | 56/158 |
| 3,349,549 A | * | 10/1967 | Van Der Lely | 56/10.2 R |
| 3,982,383 A | * | 9/1976 | Mott | 56/11.6 |
| 4,011,709 A | * | 3/1977 | Mott et al. | 56/10.4 |
| 4,070,810 A | * | 1/1978 | Brakke | 56/291 |
| 4,191,006 A | * | 3/1980 | Kerber et al. | 56/11.6 |
| 4,193,250 A | * | 3/1980 | Kessens et al. | 56/208 |
| 4,198,803 A | * | 4/1980 | Quick et al. | 56/296 |
| 4,538,404 A | * | 9/1985 | Heimark et al. | 56/314 |
| 4,575,998 A | * | 3/1986 | Brooks | 56/312 |
| 4,702,064 A | * | 10/1987 | Hunter et al. | 56/312 |
| 4,757,673 A | * | 7/1988 | Gayman | 56/314 |

OTHER PUBLICATIONS

Photographs and description of Claas V900 Auto-Contour Header 2005.

* cited by examiner

*Primary Examiner*—Árpád F Kovács
(74) *Attorney, Agent, or Firm*—Michael G. Harms; John William Stader; Patrick M. Sheldrake

(57) ABSTRACT

In a header having a movably mounted knife and a guard for shielding the moving and rotating components operating the knife, the guard preferably comprising two interconnected parts of which the first part is mounted on the header so as not to move with the knife and the second part is coupled for movement with the knife. In this way, the area shielded by the guard automatically expands and contracts with movement of the knife.

12 Claims, 13 Drawing Sheets

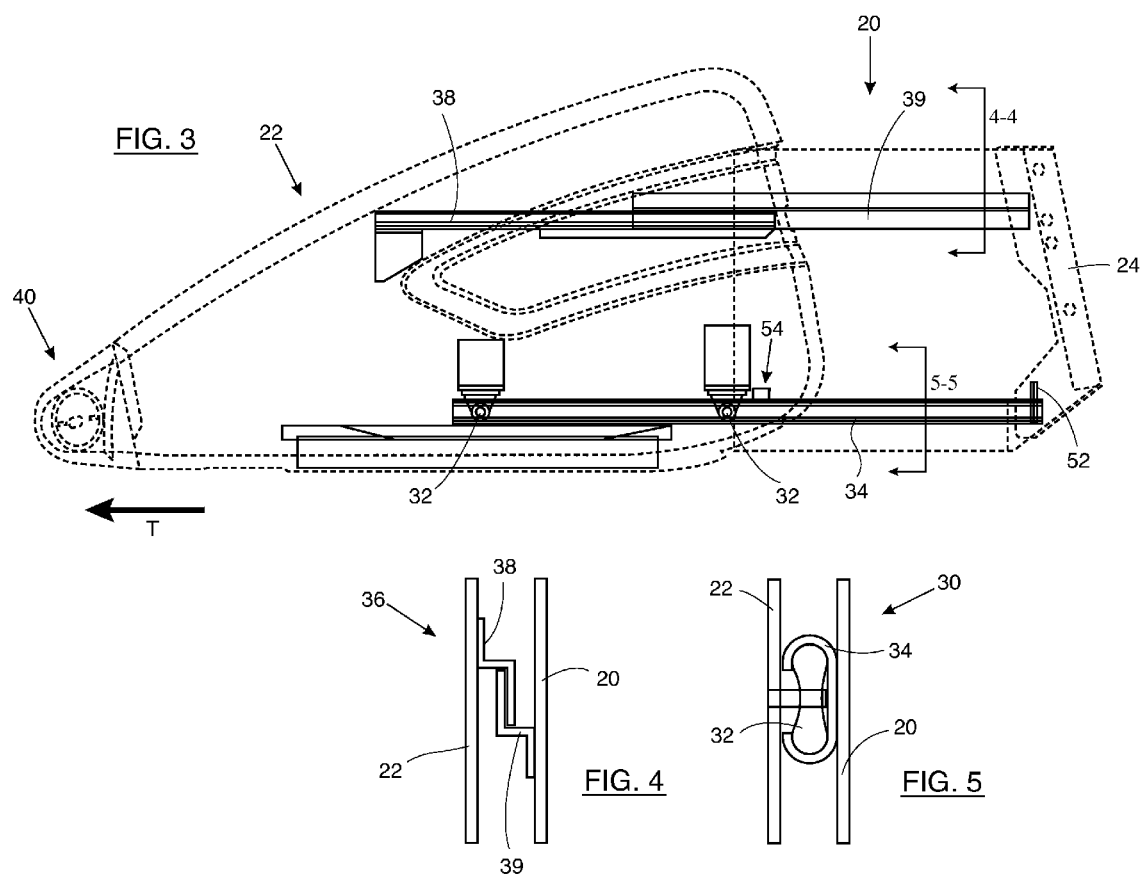

US 7,380,392 B2

GUARD FOR A HEADER OF A HARVESTER

This application claims the benefit of U.S. Provisional Application No. 60/684,930, filed May 25, 2005.

FIELD OF THE INVENTION

The present invention relates to a guard for a header of a harvester, in particular a header having an adjustably mounted knife.

BACKGROUND OF THE INVENTION

In some headers of a combine or forage harvester, crop is cut near the ground by an oscillating cutter. Though the cutter may use a scissoring action, it is commonly referred to as a "knife" and this term will be used herein to include any form of cutter. A reel with tines rotates in front of the knife about a horizontal axis to gather the cut crop and to drive it onto an auger which advances the crop towards the vehicle centerline. From there, conveyors carry the crop into the processing machinery. In the case of a combine harvester, the processing machinery separates the grain from the stalks and the chaff. The grain is stored in a grain tank while the stalk and the chaff are discharged from the rear of the harvester. In a forage harvester, the processing machinery chops the entire crop into small pieces and discharges it from a spout into a second vehicle driven alongside the harvester.

Commonly, the knife is mounted in a fixed position on the header and the various rotating and moving parts that drive the knife are covered by a guard. The guard is constructed as a door which can be hinged open to allow access to the parts which drive the knife. These parts include the so-called "wobble box," which reciprocates a blade of the knife, and the pulley driving the wobble box.

In some headers, the knife can be moved forwards and backwards from a central position by about 50 cms. In headers having an adjustably mounted knife, a problem is encountered because the movement of the knife can result in some rotating and moving parts becoming exposed, as they are no longer shielded by the guard.

SUMMARY OF THE INVENTION

With a view to mitigating the foregoing disadvantage, the present invention provides a header having a movably mounted knife and a guard for shielding moving and rotating components operating the knife, wherein the guard is formed of two interconnected parts of which the first is mounted on the header so as not to move with the knife and the second is coupled for movement with the knife, whereby the area shielded by the guard expands and contracts with movement of the knife.

Preferably, the first part of the guard is hinged on the header (i.e. the header frame) and the second part is mounted for sliding movement relative to the first part. More specifically, a half-hinge, or any other suitable type of hinge, is affixed to the header frame, and another half-hinge is affixed to the first part of the guard. Both half-hinges are interconnected by any suitable means, such as a hinge pin.

To enable the sliding movement between first and second parts of the guard, the first part of the guard may comprise upper and lower parallel supports for the second part and at least one of the supports is formed as a runner which receives rollers mounted on the second part.

For example, the upper rail could comprise a bracket of L-shaped section on the first part engaged by a bracket of inverted L-shape section on the second part, the limbs of the two brackets interlocking with one another to prevent separation of the parts without supporting the weight of the second part on the first part. This makes for a less expensive construction that is easy to assemble and avoids problems if the two support brackets are not accurately aligned parallel to one another. The lower rail runner or track could be C-shaped to receive roller wheels.

It is contemplated that the lower rail of the first part of the guard may contain a device to prevent the first part and the second part of the guards from separating. Preferably, the rail can include an upright rod at its rear end. Additionally, the roller wheels, which cooperate with the lower rail, can include a U-shaped safety lock, preferably made of spring steel, which is intended to receive the upright rod through interference fit.

This safety lock will catch over the rod on the first part of the guard and release when sufficient force is applied. The aim of this lock is that, when the guard is opened, the operator can slide the first part fully backwards so the safety lock catches, and the guard will not slide forward or backward on its own. Pulling the second part of the guard forward with enough force will release the safety lock and allow the guard to be closed on the header again.

In the preferred embodiment of the invention, the second part of the guard is also formed with a catch that is releasably engaged by a component that moves with the knife, so that the two parts of the guard automatically slide relative to one another with movement of the knife. Release of the catch permits the two parts of the guard to be pivoted together relative to the header.

BRIEF DESCRIPTION OF THE FIGURES

The invention will now be described further, by way of example, with reference to the accompanying drawings, in which:

FIG. 3 is a left side skeleton drawing of the guard in conjunction with the header frame of FIG. 2;

FIG. 4 is a section view, taken along lines 4-4 in FIG. 3, through the upper of two supports connecting the two parts of the guard of FIG. 3 to one another;

FIG. 5 is a section view, taken along lines 5-5 in FIG. 3, through the lower of the two supports connecting the two parts of the guard of FIG. 3 to one another;

DETAILED DESCRIPTION OF THE PREFERRED EMBODIMENTS

Figure 1:
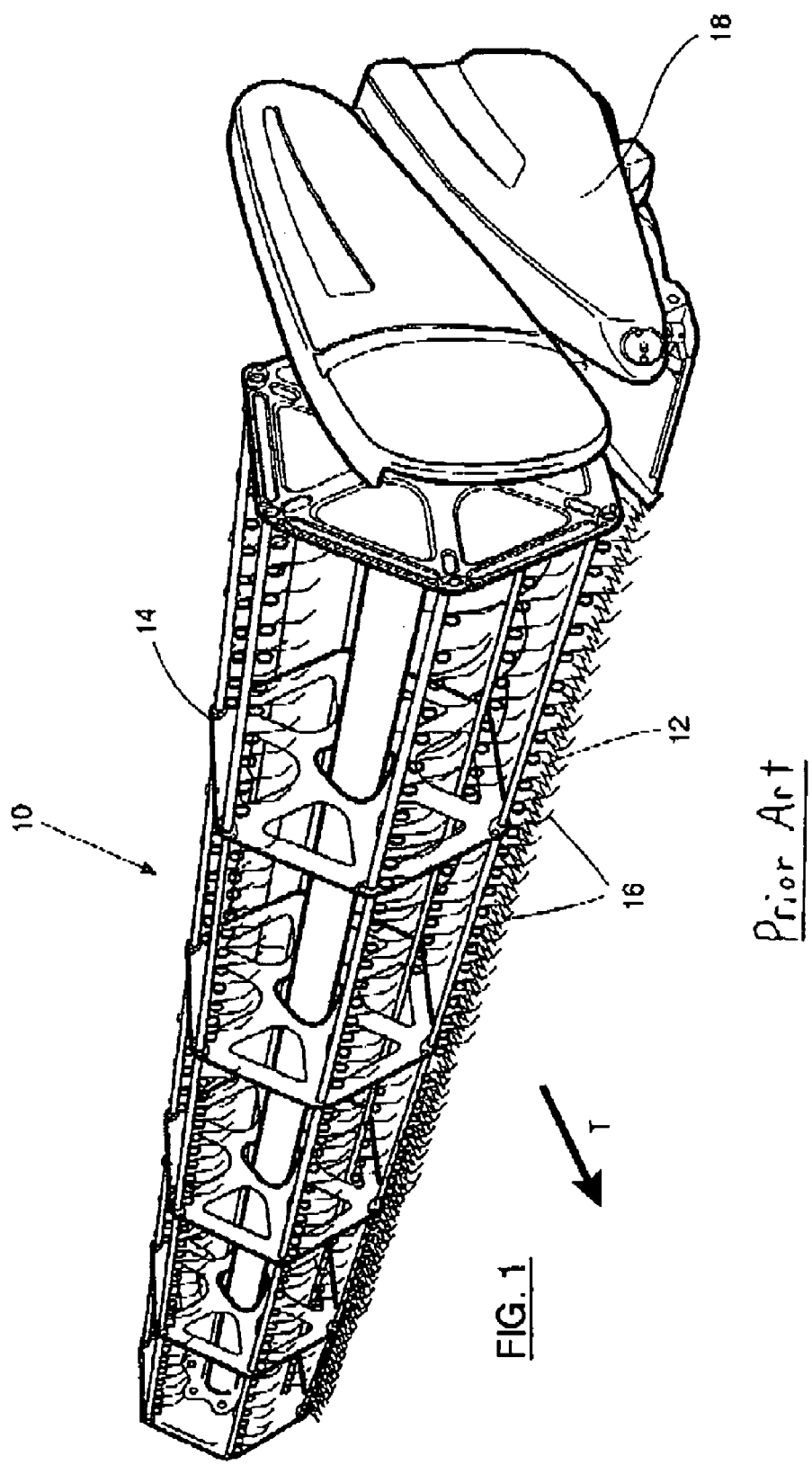
FIG. 1 is a perspective view of a conventional header having a header assembly including a header frame and guard.

The header 10 shown in FIG. 1 has a crop cutter or knife 12 arranged close the ground. The knife comprises a stationary blade and a reciprocating blade which together act as shears which cut the crop near the ground. A reel 14 having tines 16 rotates about a horizontal axis next to the knife 12 to gather the cut crop and feed it into the processing machinery of the harvester (not shown).

Figure 8:
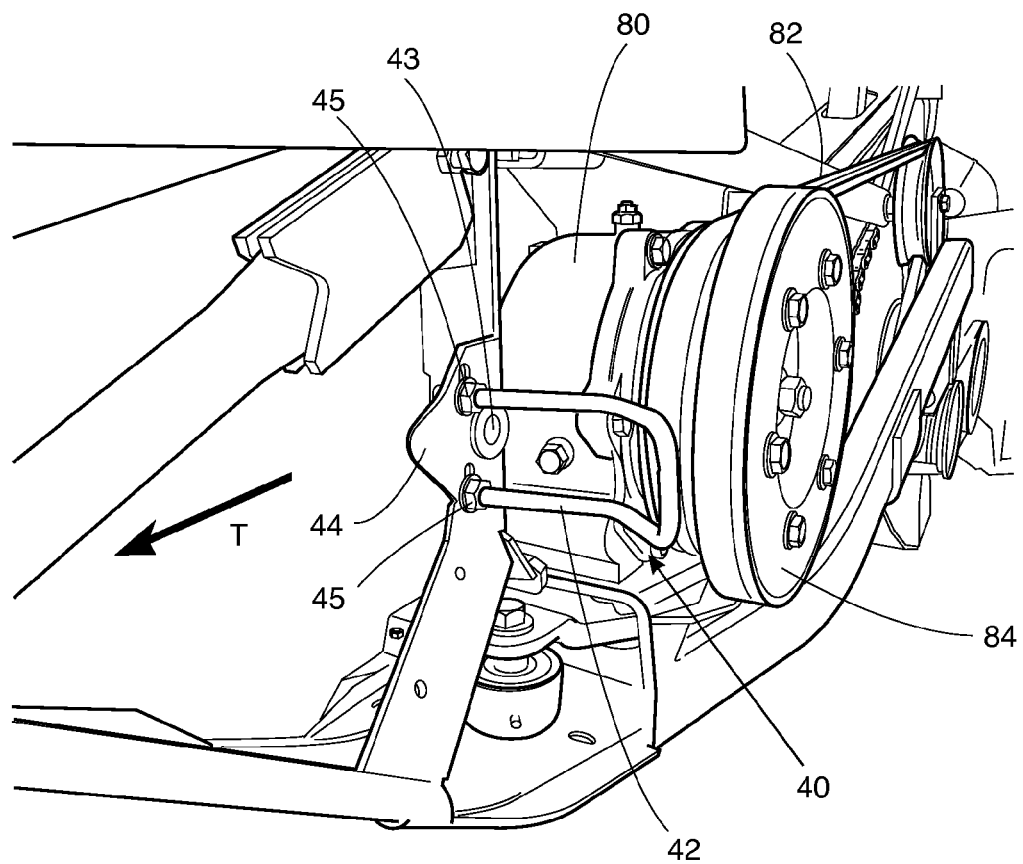
FIG. 8 is a front left view of the header frame of FIG. 7, with the guard removed, illustrating the locking stirrup and locking pin aperture of the present invention.
Figure 9:
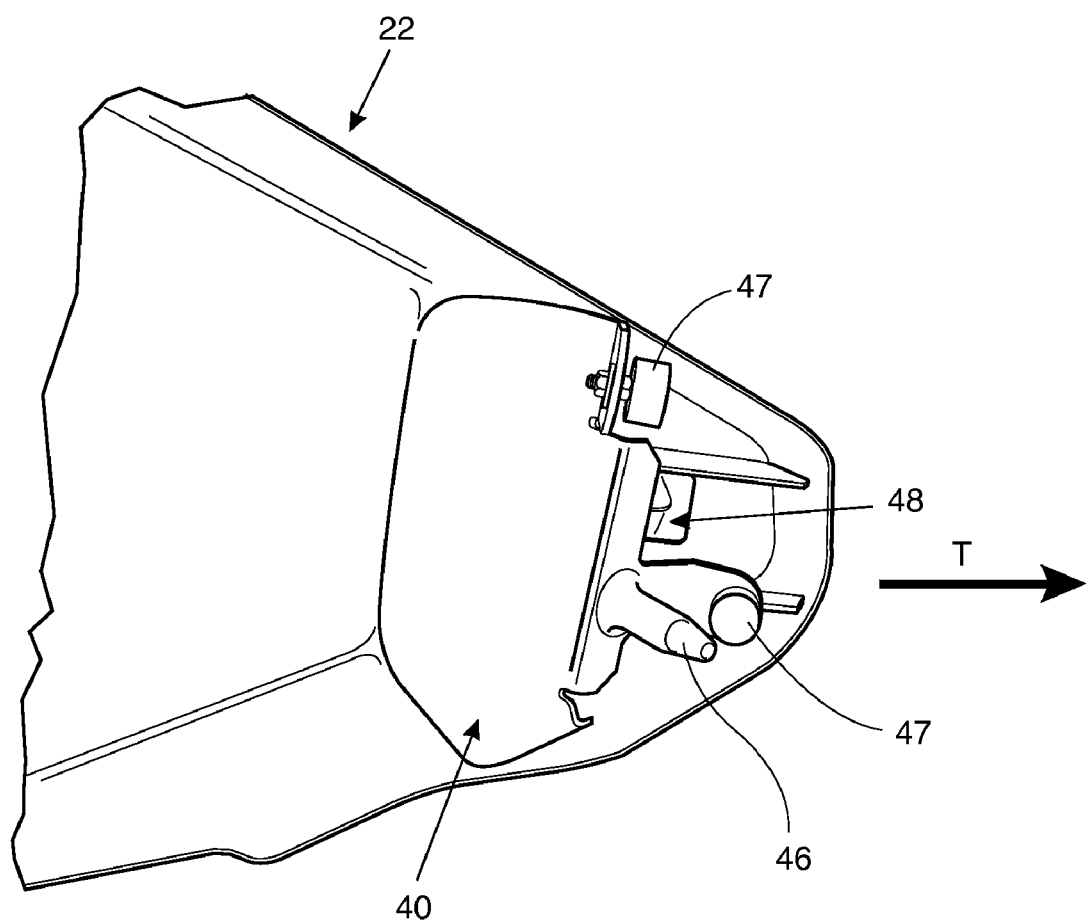
FIG. 9 is a front right inside view of the guard of FIG. 2, illustrating the locking pin and dampers of the present invention.
Figure 10:
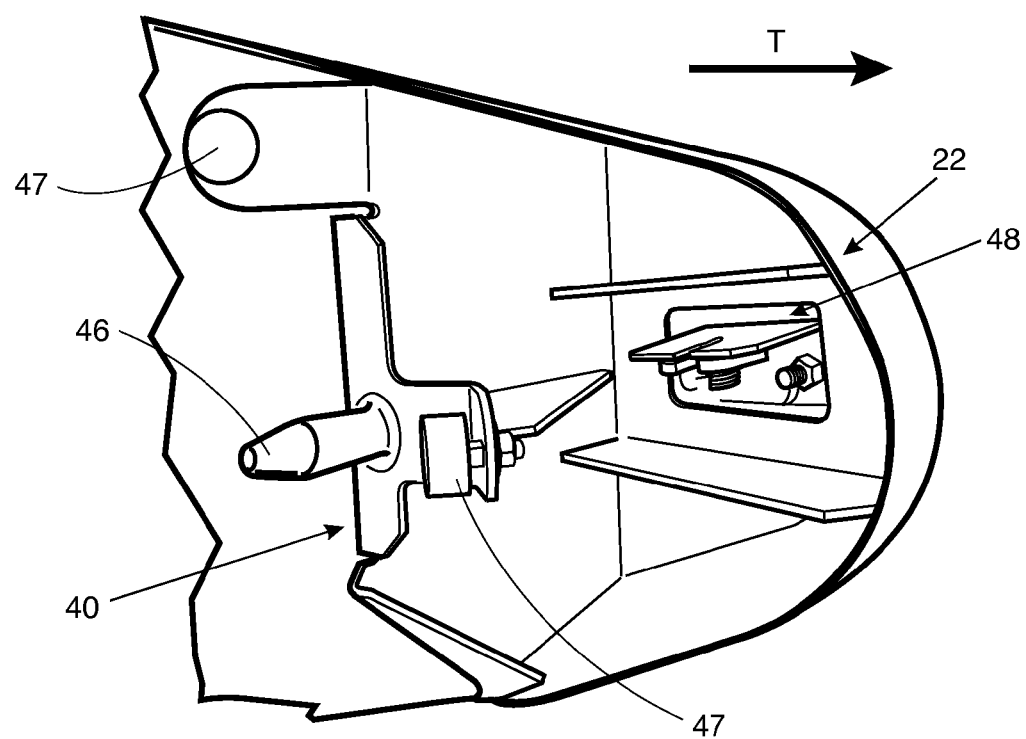
FIG. 10 is an additional front right inside view of the guard of FIG. 2, illustrating the locking pin, dampers, and latch mechanism of the present invention.
Figure 11:
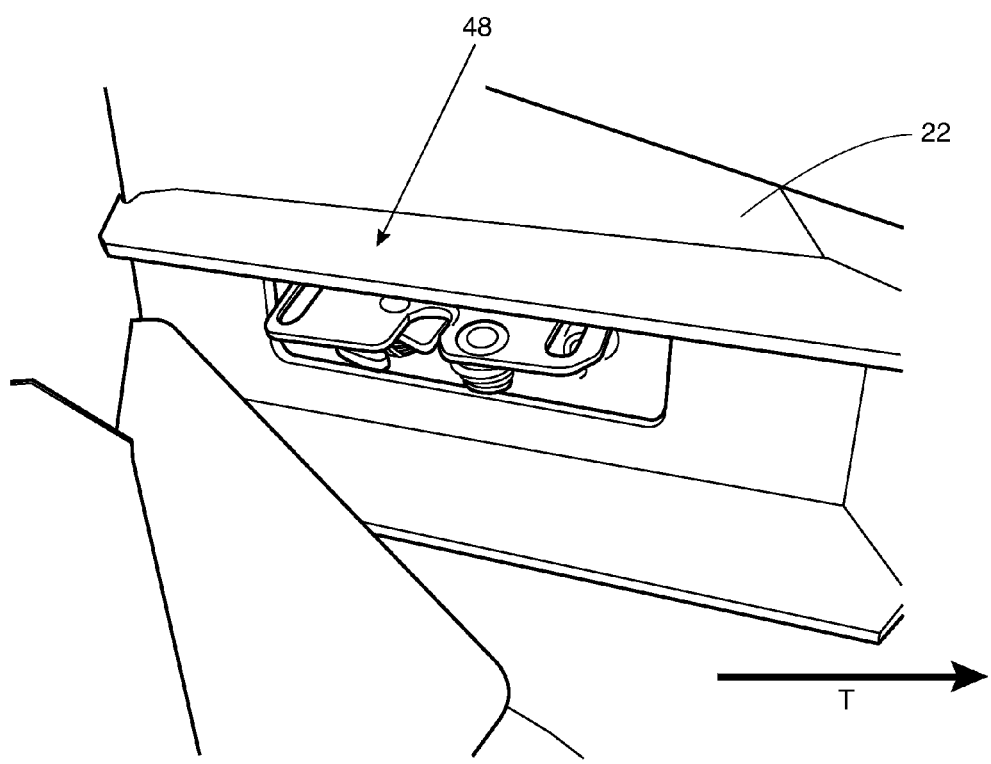
FIG. 11 is a front right inside view of the guard of FIG. 2, illustrating the latch mechanism of the present invention.
Figure 12:
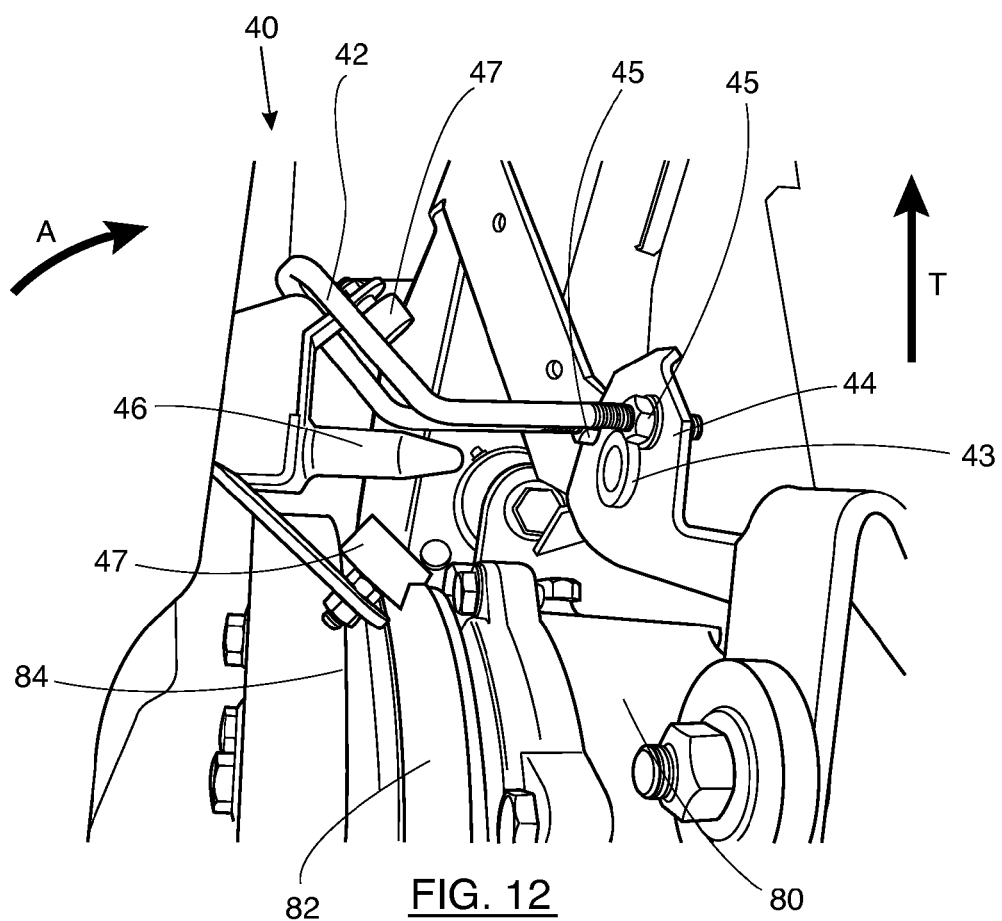
FIG. 12 is a top view of the guard of FIG. 2 in conjunction with the header frame at a beginning closing position "A", illustrating the locking pin and dampers of the guard interacting with the locking stirrup and locking pin aperture of the header frame.
Figure 13:
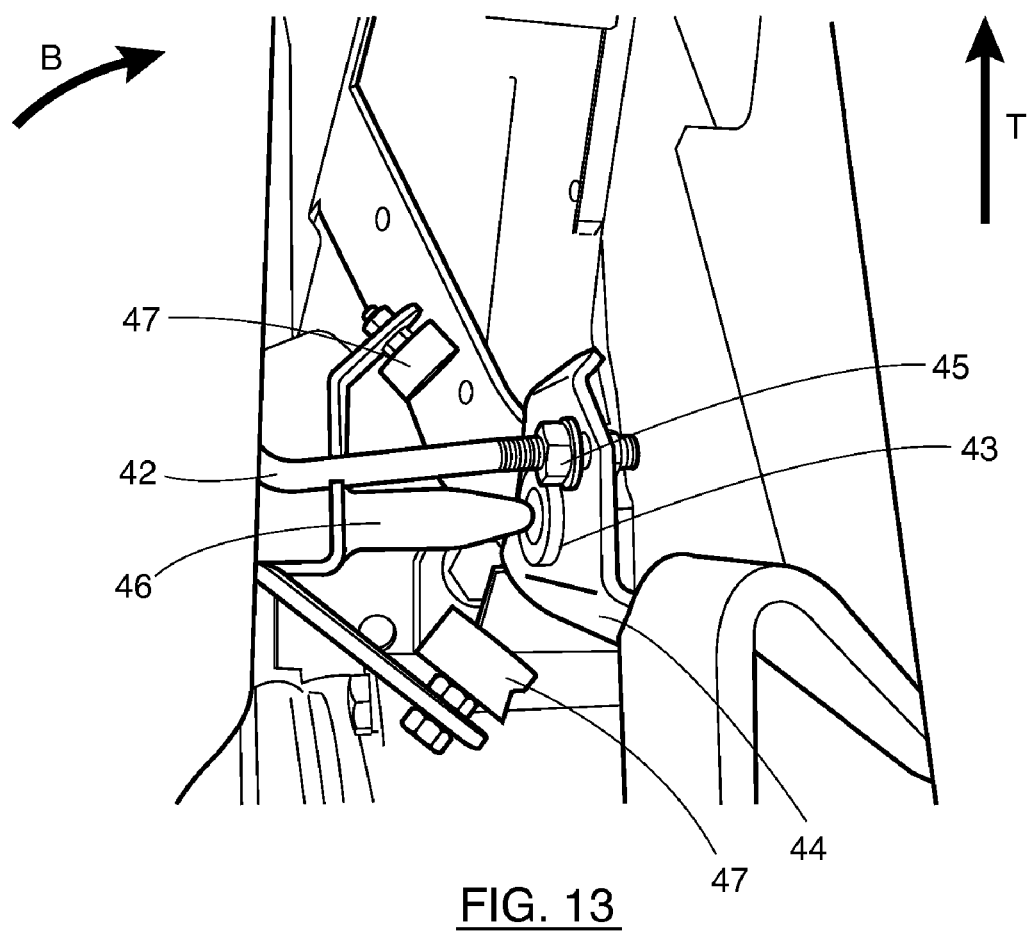
FIG. 13 is a top view of the guard of FIG. 2 in conjunction with the header frame at an intermediate closing position "B", illustrating the locking pin and dampers of the guard interacting with the locking stirrup and locking pin aperture of the header frame.

At one end only of the header, there is provided a wobble box 80 (shown in FIG. 8), which reciprocates the movable blade of the knife 12. The wobble box 80 is driven by means of a drive belt 82 and a drive pulley 84, which are shielded by means of a guard 18. This serves to prevent crop from becoming entangled in the drive train of the wobble box 80 and also avoids the risk of injury to a person standing nearby. To allow access to the wobble box 80 and its drive train for servicing, the guard 18 is designed as a door which can be hinged open at its rear end and is kept closed by a catch at its front end.

The header shown in FIG. 1 has a fixed knife. There are other headers, however, in which the knife 12 can be moved forwards and backwards to each side of a central position, through a distance of as much as, for example, 40 cms. In such a header 10, the guard 18, as shown in FIG. 1, is not sufficiently large enough to shield the wobble box 80 and its drive train when the knife 12 is in its forward position.

Figure 2:
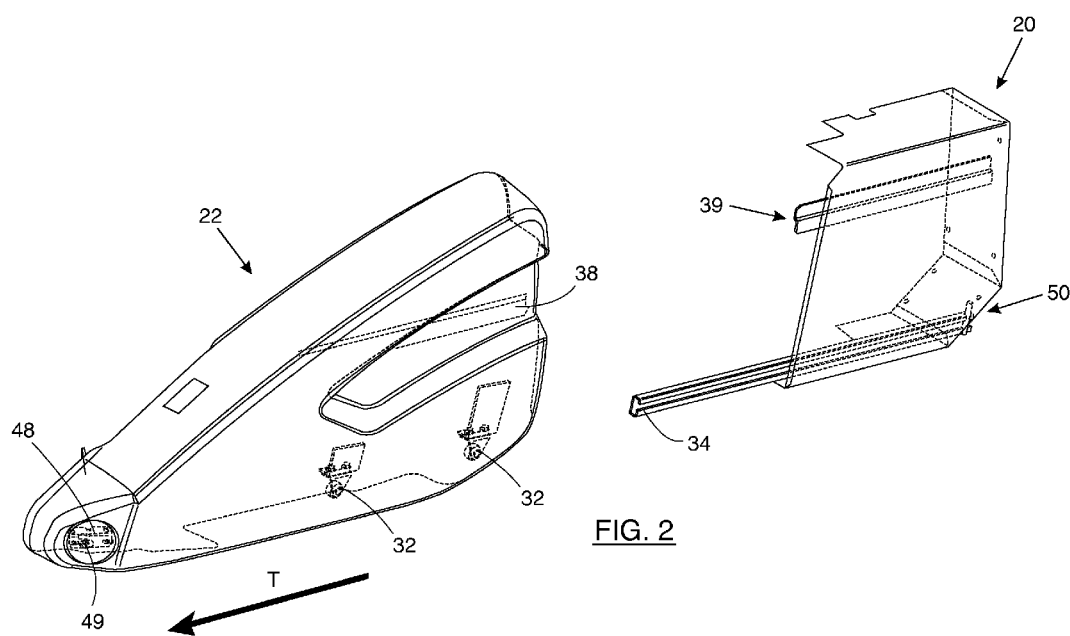
FIG. 2 is a left side view, relative to a forward direction of travel T of the harvester (this direction allocation hereinafter inherent in all figure descriptions), of the first and second part of the guard of the invention.

The preferred embodiment of the invention, which will now be described by reference to FIGS. 2-15, mitigates the above problem by providing a guard 18 having a variable geometry, to be effective in all positions of the knife 12. As illustrated in the left side view (relative to a forward direction of travel T of the harvester) of FIGS. 2-3, the guard 18 is formed of a first part 20, which is mounted on a stationary component of the header (i.e. header frame) by means of a hinge 24. The guard 18 also comprises a second part 22, which is slidably carried on the first part 20 by means of two supports 30 & 36, which will be described below in greater detail.

A catch 40, which is shown in more detail in FIGS. 2 and 7-15, releasably connects the front end of the second part 22 of the guard 18 for movement with the knife 12. In this way, as the knife 12 moves forwards and backwards, it causes the second part 22 of the guard 18 to slide relative to the first part 20 so that the wobble box 80 and its drive train (FIG. 8) always remain shielded.

As can be seen from the section view of FIG. 5, the lower support 30 for the second part 22 of the guard 18 preferably comprises rollers 32 secured to the second part 22, which are held captive within, and slide along, a lower rail 34, such as a runner or track, affixed to the first part 20. Rollers and runners are of course commonly used in many applications, for example to mount drawers in furniture, and it is not therefore deemed necessary to describe them in detail. Their use provides a smooth and silent sliding action. Furthermore, because the rollers 32 are held captive in the runner 34, they prevent relative movement between the two parts 20, 22 in the vertical plane.

If one of the two supports 30 is formed by rollers 32 guided in runners 34, the second 36 need only be designed more simply, as shown in the section view of FIG. 4, as two L-shaped brackets 38 & 39 having limbs which engage one behind the other. Such engagement prevents the two parts 20, 22 from being separated from one another but does not serve to support the weight of the second part 22. Aside from reducing cost, such a construction makes parallel alignment of the two supports 20, 22 less critical.

Figure 6:
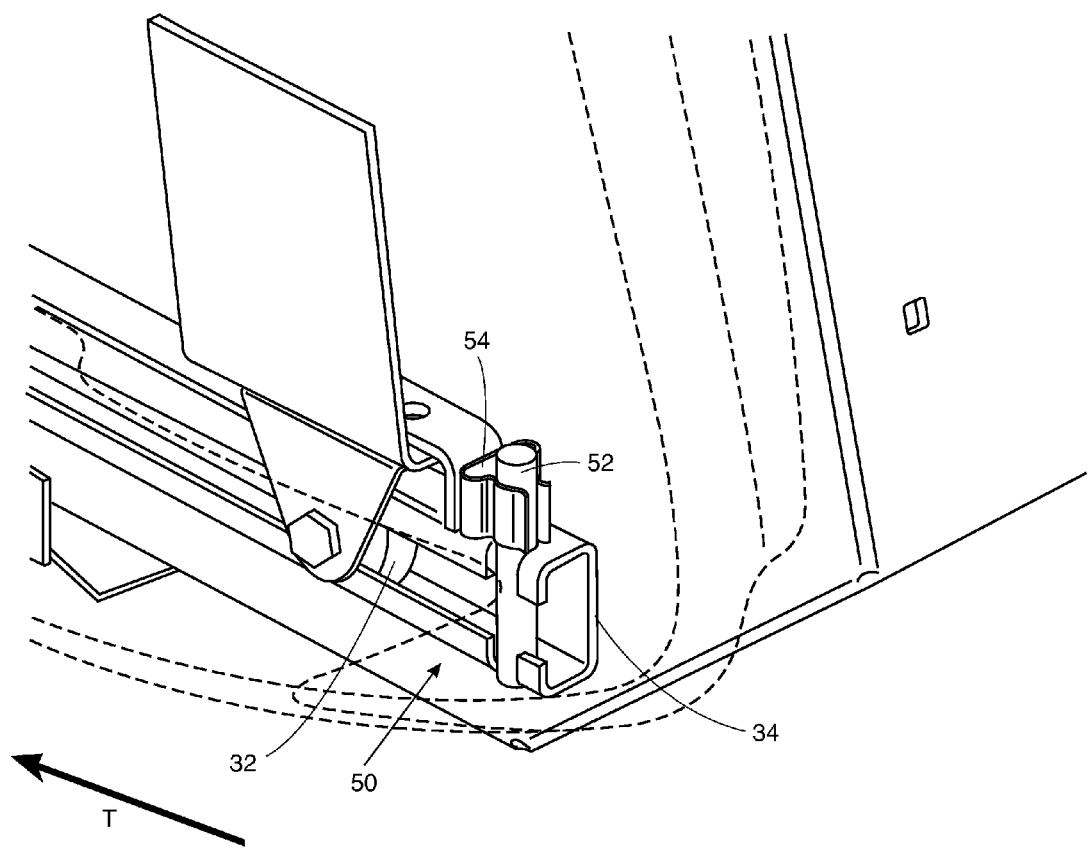
FIG. 6 is a left rear view of the lower support of FIG. 5, showing the safety lock of the guard and header frame of FIG. 2.
Figure 7:
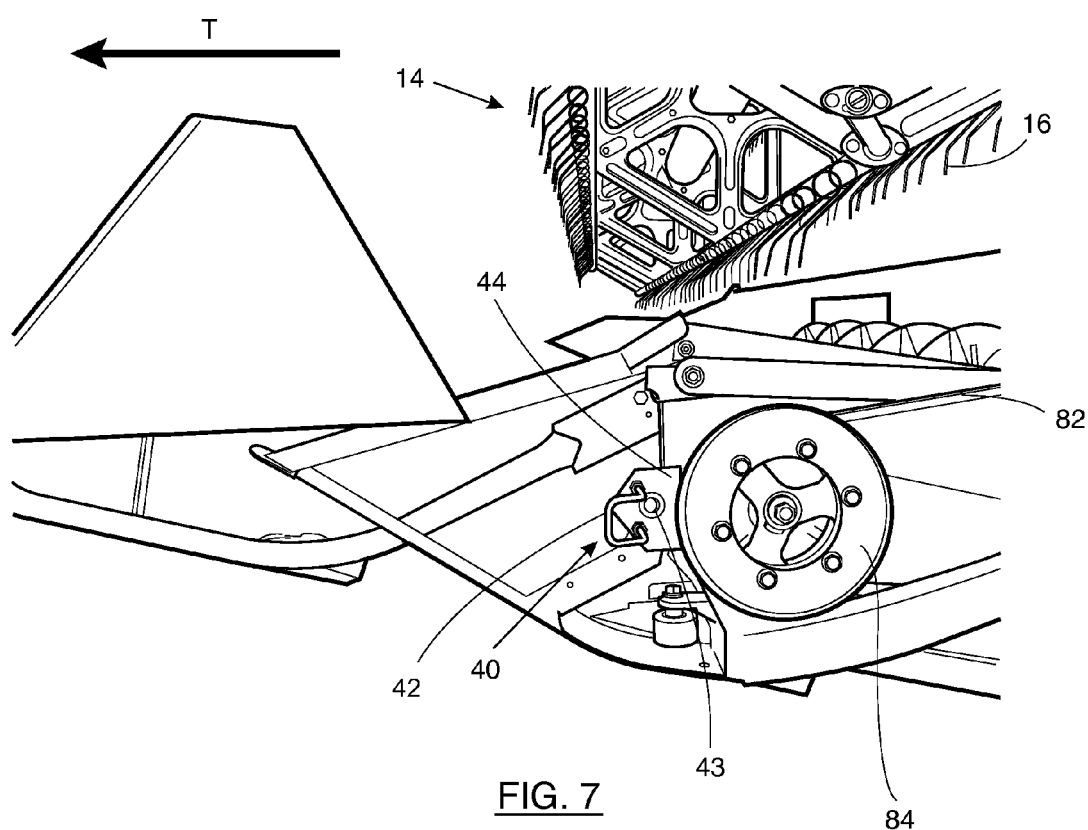
FIG. 7 is a left side view of the header frame of FIG. 2, with the guard removed, illustrating the locking stirrup and locking pin aperture of the present invention.

Turning now to FIG. 6, it is preferred that the runner or track 34 of the first part 20 of the guard 18 contains a device 50 to prevent the first part 20 and the second part 22 of the guards 18 from separating at both ends. Preferably, this device 50 could be an upright rod 52 mounted at the front and rear ends of the lower runner or track 34. In reference to the rear end of the lower runner or track 34, the support of the rearmost roller wheels 32 can include a U-shaped safety lock 54, preferably made of spring steel, which receives the rearmost upright rod 52 by an interference fit.

This safety lock 54 will catch over the rod 52 on the first part 20 of the guard 18 and release when sufficient force is applied. The aim of this lock 50 is that, when the guard 18 is opened, the operator can slide the second part 22 fully backwards so the safety lock 54 catches, and the second part 22 of the guard 18 will not slide forward or backward on its own. Pulling the second part 22 of the guard 18 forward with enough force will release the safety lock 54 and allow the guard 18 to be closed on the header 10 again.

Turning now to FIGS. 7-15, the catch 40 is intended to serve two purposes. First, it couples the second part 22 of the guard 18 to the front section of the header frame 10 for movement with the knife 12. Second, it supports the weight of the guard 18 because, when the guard 18 is extended to its maximum length, it can place undue stress on the hinge 24. Thus the catch 40 prevents movement of the front end of the guard 18 in two mutually perpendicular planes.

To ensure that the second part 22 of the guard 18 moves horizontally with the knife 12, a U-shaped locking stirrup 42 is bolted to a plate 44 attached to the front section of the header frame 10 so that it moves with the knife 12. The free ends of limbs of the locking stirrup 42 are preferably threaded and are secured to the plate 44 by means of nuts 45. This method of fixing enables the amount that the stirrup 42 projects from the plate 44 to be adjusted. However, it should be realized that other suitable methods of affixing the locking stirrup 42 to the plate 44 are also contemplated.

To support the weight of the free end of the guard 18 and prevent it from moving vertically, the header frame also includes a locking aperture 43 formed in the base plate 44 of the stirrup 42. The locking aperture 43 includes a bushing, which is mounted thereto. The bushing preferably is made out of plastic material, such as polyamide.

The interior of the second part 22 of the guard 18 includes a locking pin 46 having a preferably conical point, two dampers 47, which may be formed of rubber or any other dampening material, and a latch mechanism 48, which has an access knob 49 accessible to the exterior of the second part 22 of the guard 18. The latch mechanism 48 may be constructed in a manner similar to latch mechanisms used on motor vehicles to hold down the hood or the lid of a trunk.

In operation, such as when it is desired to close the guard 18 from an open position, the first part 20 of the guard 18 is hinged towards a closed position and when nearly closed the second part 22 is slid to the extent necessary to align the locking pin 46 with the bushing of the locking aperture 43 in the plate 44. The locking pin 46 fits within the bushing and locking aperture 43, such that the header frame bears the loads generated by sliding both parts 20, 22 of the guard 18 relative to each other. The second part 22 of the guard 18 is then pushed shut so that the latching mechanism 48 engages with the locking stirrup 42.

In addition to the above, the two rubber dampers 47, which are preferably mounted at an angle to each other (i.e. in a V-shape), touch a corresponding surface on the front section of the header frame 10 when the second part 22 of the guard 18 is closed. These dampers 47 are adjusted in such a way that they are slightly compressed when the guard 18 is closed. This arrangement provides additional vibration suppression (the reciprocating movement of the header knife 12 creates vibrations, which tend to propagate through the header 10 and can lead to premature failures and excessive noise generated by the plates of the guard 18). Once the catch 40 is engaged, the wobble box 80 and its drive train 82, 84 will automatically remain adequately shielded in all positions of the knife 12.

When access to the wobble box 80 is required for servicing, the guard 18 can be opened in the same way as the guard 18 in FIG. 1. In particular, the latch mechanism 48 must first be released. Release of the latch mechanism 48 can occur at a single access point, a luxury not afforded by the prior art.

Figure 14:
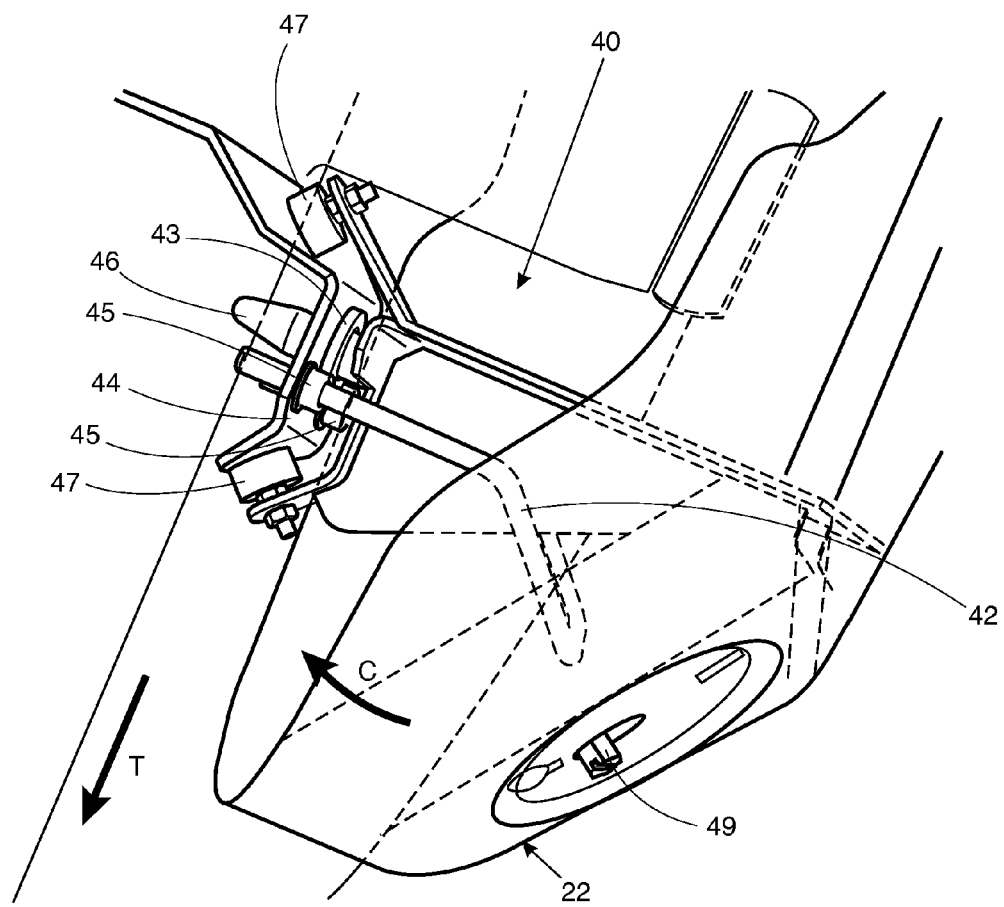
FIG. 14 is a top transparent view of the guard of FIG. 2 in conjunction with the header frame at a final closed, locked position "C", illustrating the locking pin and dampers of the guard with the locking stirrup and locking pin aperture of the header frame.
Figure 15:
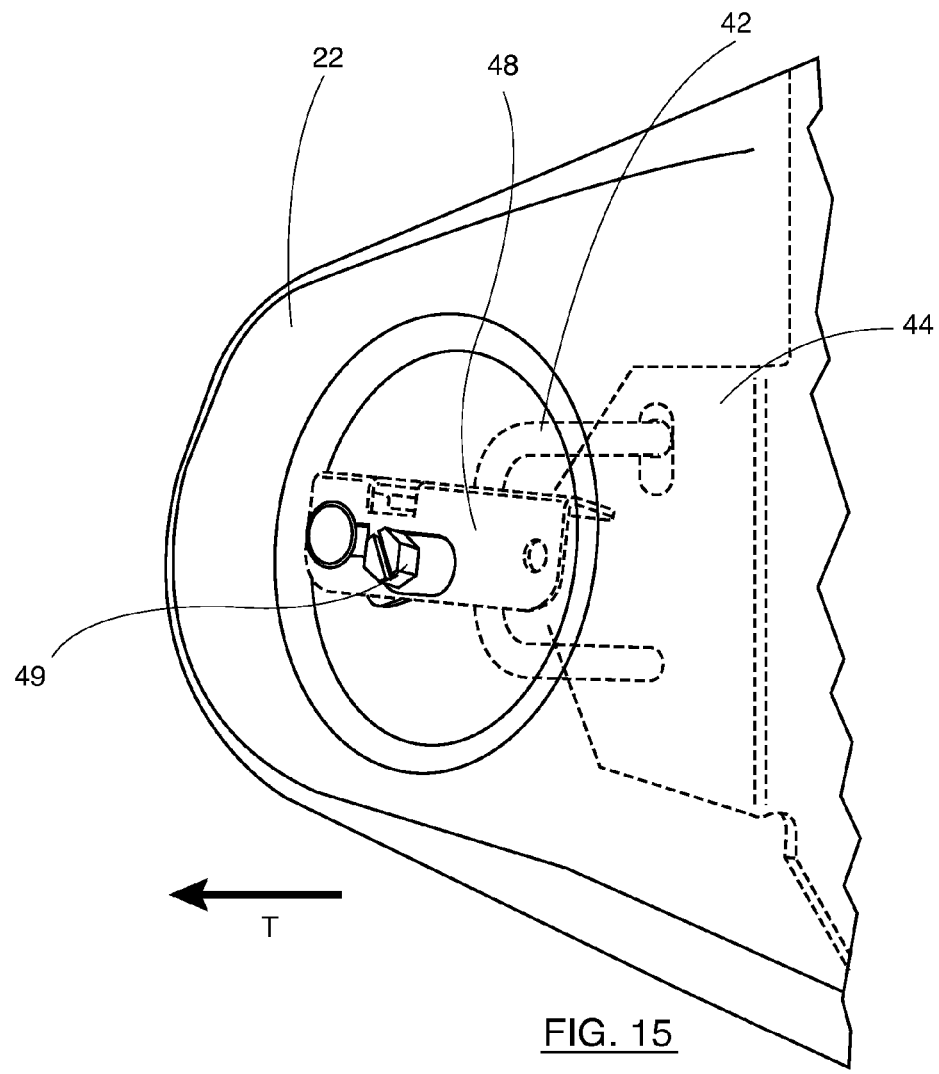
FIG. 15 is a top, outside transparent view of the locking stirrup of the header frame secured in place within the latch mechanism of the guard of FIG. 2, further illustrating the interaction of the locking pin and dampers with the locking pin aperture of the header frame and a hex knob accessible from the outside of the guard to unlock the guard from the header frame.

It is contemplated that the present invention may employ a variety of latch mechanisms 48, such as those that may be released remotely either electrically or mechanically, for example using a Bowden cable. Additionally, and as shown in FIGS. 14 and 15, the latch mechanism can be released mechanically through "an action", that is, through the turning of a knob 49 from the exterior of the second part 22 of the guard 18. Preferably, this knob 49 has a hexagonal or other distinctive shape, which requires a specific tool to actuate it, such that it cannot be opened by inadvertent by-passers.

Thus, to open the guard 18, the operator can simply turn the knob 49 on the lock to any pre-set, desired range, such as about 45 degrees, and pull the shield 18 toward him, thereby disengaging the locking stirrup 42 from the latching mechanism 48. Alternatively, the latch mechanism 48 may simply be a spring latch designed to release the locking stirrup 42 when the guard 18 is released from its closed position.

In reference to FIG. 3, after the catch 40 is released through actuation of the latch mechanism 48, the operator can then slide the second part 22 of the shield 18 backwards until the safety lock 50 at the back catches and then the two parts 20, 22 of the guard 18 can be swung open about the hinge 24.

What is claimed is:

1. A guard for a header of a harvester having a movably mounted knife, the guard shielding moving and rotating components operating the knife, the guard comprising:
a first part interconnected with a second part, the first part being mounted on the header so as not to move with the knife and the second part being coupled for movement with the knife, wherein the area shielded by the guard expands and contracts with movement of the knife, the first part being hinged on the header and the second part being mounted for sliding movement relative to the first part, and wherein the guard includes a single catch such that release of the single catch permits the two parts of the guard to be pivoted together relative to the header.

2. The guard according to claim 1, wherein the catch comprises a U-shaped stirrup having at least two free end limbs, the free end limbs being secured to a support plate that moves with the knife, a latch mechanism mounted on the second part of the guard to engage the base of the stirrup to prevent the second part of the guard from moving horizontally relative to the knife, the catch further comprising a locking projection extending from the second part of the guard into an aperture defined within the support plate in order to support the weight of the end of the guard remote from the hinge.

3. The guard according to claim 1, wherein the catch comprises a latch mechanism, the latch mechanism locking the two parts of the guard to one another to prevent the second part from sliding relative to the first when the guard is hinged open.

4. The guard according to claim 1, wherein the first part of the guard comprises upper and lower parallel supports for the second part and wherein the second part comprises rollers mounted thereto, at least one of the upper and lower parallel supports comprising a runner which receives the rollers mounted on the second part.

5. The guard according to claim 4, wherein the upper support comprises a bracket of L-shaped section on the first part engaged by a bracket of inverted L-shape section on the second part, limbs of the two brackets interlocking with one another to prevent separation of the parts without supporting the weight of the second part on the first part.

6. The guard according to claim 4, wherein an upright rod is mounted to the runner and a U-shaped lock is coupled to the lower parallel support so that the U-shaped lock receives the upright rod, thereby preventing the second part from separating from the first part.

7. A guard for a header of a harvester, the header having a stationary component and a non-stationary component, the non-stationary component configured to operate a movably mounted knife, the guard shields the non-stationary component, the guard comprising:
a first part mounted to the stationary component of the header; and
a second part coupled to the knife and slidably mounted to the first part wherein the second part is slidable relative to the first part so as to shield the non-stationary component of the header when the knife moves in a direction parallel to a longitudinal axis of the harvester, wherein the first part slidably supports the second part by at least one of an upper support and a lower support, wherein at least one of the lower and upper supports of the first part is a rail and the second part has at least one roller, whereby the rail supports the second part by the at least one roller.

8. A guard according to claim 7, wherein the first part has a rear end fixedly mounted to a frame of the header by a hinge, the first part rotatable about the hinge thereby allowing access to the non-stationary component.

9. A guard according to claim 7, wherein the at least one roller is held captive by the rail thereby preventing relative movement between the first and second part in a vertical plane.

10. A guard according to claim 7, wherein at least one of the lower and upper supports of the first part is an L-shaped bracket and the second part has at least one complimentary L-shaped bracket, whereby limbs of each L-shaped bracket engage each other so that the first part supports the second part.

11. A guard according to claim 7, wherein the guard further comprises a lock preventing the second pert from separating from the first part.

12. A guard according to claim 7, wherein at least one of the lower and upper supports has a rod extending vertically therefrom, further wherein the second part has a U-shaped lock for releasably coupling to the rod to prevent the second part from separating from the first part.

* * * * *